Oct. 31, 1933.          L. OCHTMAN, JR., ET AL          1,932,636
                     ROTARY VALVE FOR COMPRESSORS
                    Filed April 13, 1932        5 Sheets-Sheet 1
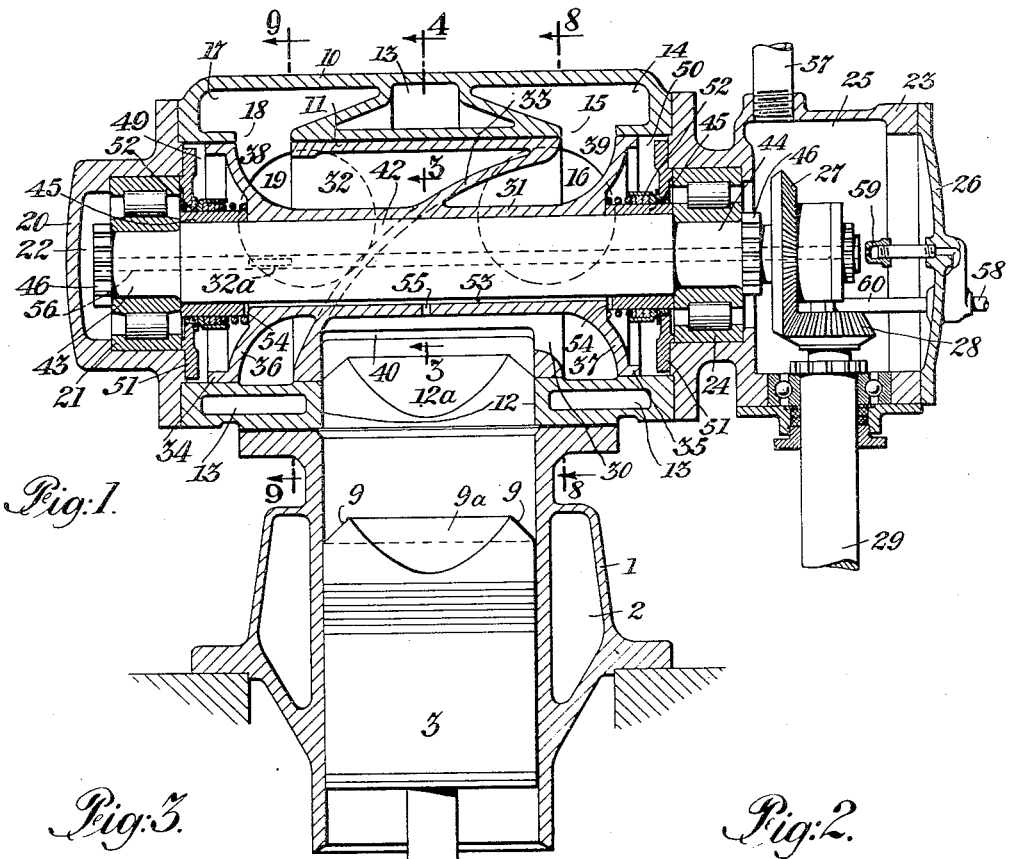
Fig.1.
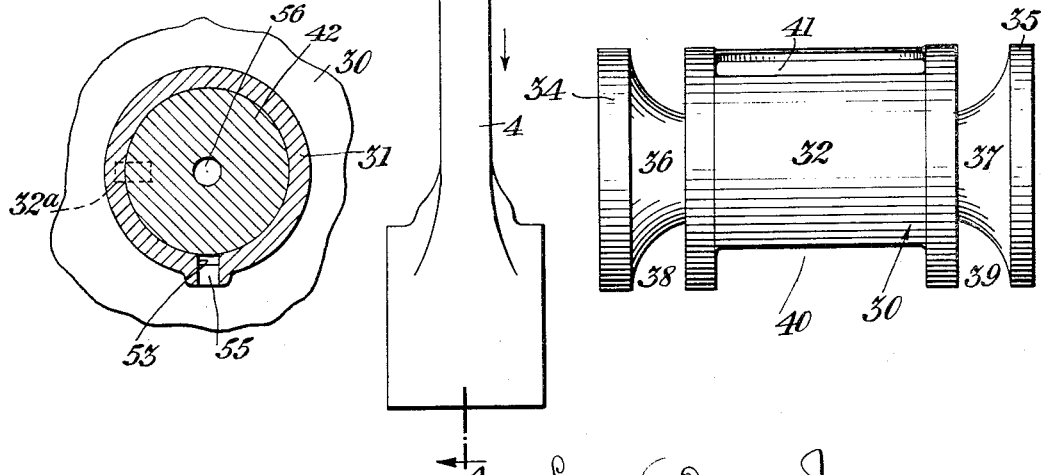
Fig.3.                                            Fig.2.
                              INVENTORS
                              Leonard Ochtman Jr
                              and Robert C. Engelman
                              BY
                              Louis Prevost Whitaker
                              ATTORNEY

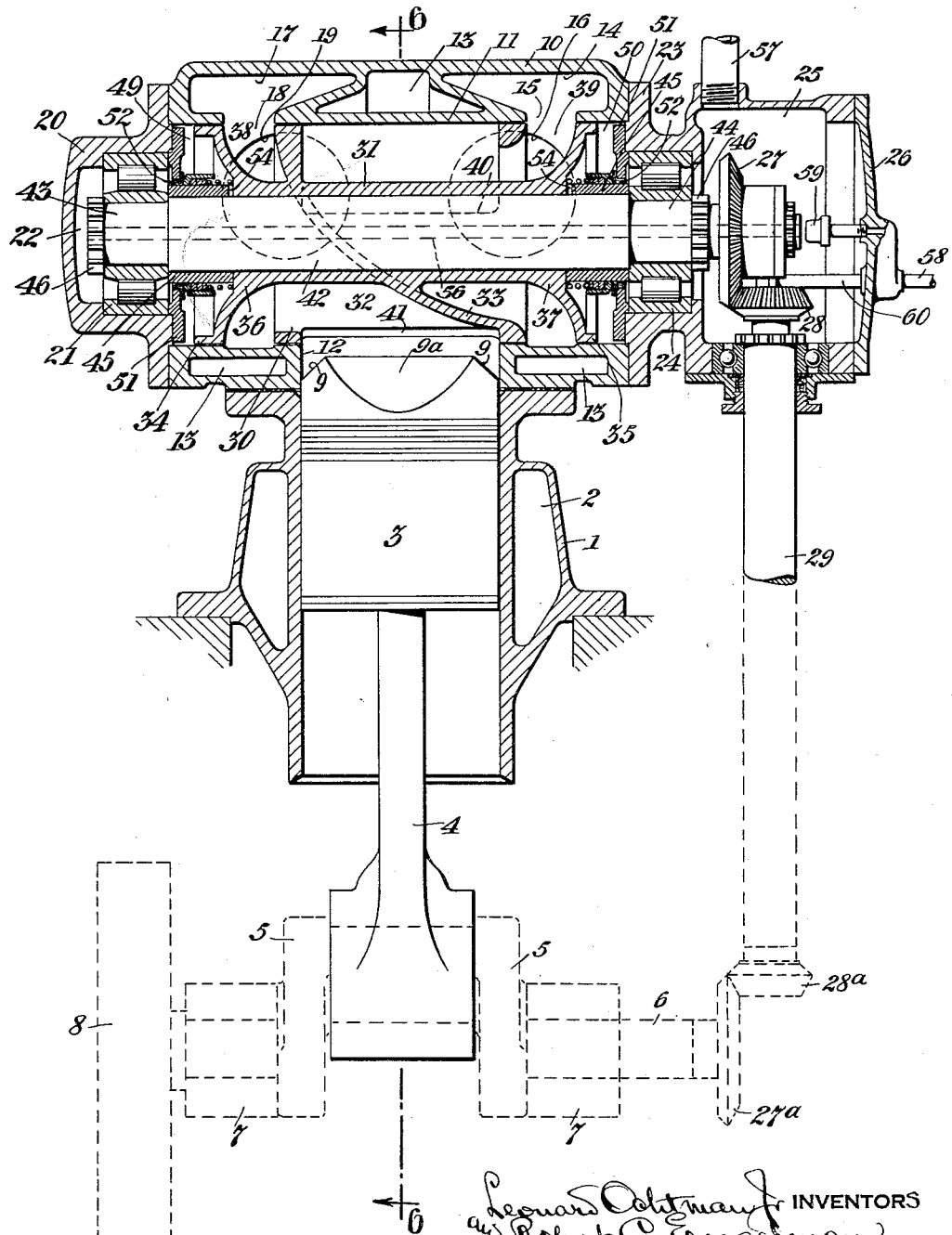

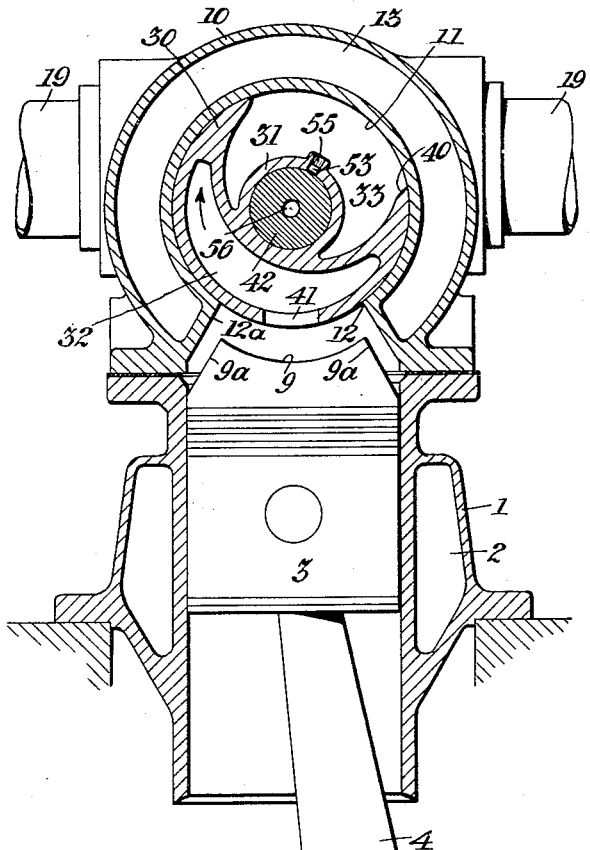

Oct. 31, 1933.  L. OCHTMAN, JR., ET AL  1,932,636
ROTARY VALVE FOR COMPRESSORS
Filed April 13, 1932  5 Sheets—Sheet 5

Leonard Ochtman Jr. INVENTORS
and Robert C. Engelman
BY
Louis Prevost Whitaker
ATTORNEY Patented Oct. 31, 1933

1,932,636

UNITED STATES PATENT OFFICE 1,932,636

ROTARY VALVE FOR COMPRESSORS

Leonard Ochtman, Jr., Plainfield, N. J., and Robert C. Engelman, Bradford, Pa., assignors to S. R. Dresser Manufacturing Company, Bradford, Pa., a corporation of Pennsylvania Application April 13, 1932. Serial No. 604,920

10 Claims. (Cl. 230—225)

This invention consists in the novel features hereinafter described, reference being had to the accompanying drawings which show one embodiment of the invention selected for purposes of illustration, and the said invention is fully disclosed in the following description and claims.

Reciprocating compressors for gas and vapors are usually provided with automatic valves of reciprocating type for placing the cylinder or cylinders in communication with the inlet and discharge pipes or passages respectively during the intake and discharge strokes of the piston or pistons. These valves are usually opened by a difference in pressures on their opposite faces, and are closed by spring pressure, and while this type of valve can be operated successfully at moderate piston speeds, and rates of revolution, they operate at a considerable disadvantage when speeds higher than those commonly used are employed. Under such higher speeds not only are mechanical failures experienced, but the efficiency of the compressor is lowered by incomplete filling of the cylinder or cylinders through inadequate valve controlled passages. This latter disadvantage is particularly serious when the gas is brought to the intake of the compressor at considerable pressure, as its high density lowers the rate of flow through the valved inlet apertures. This condition is met with specifically in the transmission of natural gas through pipe lines, where it is desired to boost the line pressure, and has prevented the construction and operation of compressors operating at higher piston speed and rates of revolution for this purpose.

It is the object of the present invention to provide a valve mechanism intended particularly for use in compressors for gas and vapors, in which the difficulties and disadvantages above referred to are eliminated, and specifically permitting the operation of such compressors at considerably higher speeds than now used, whereby a material reduction in size and cost of such compressors for a given capacity may be accomplished.

In carrying out the present invention the rotary valve hereinafter described is employed, and while this valve is particularly well adapted for use in compressors for boosting the pressure of natural gas in transporting it through pipe lines, it may obviously be employed in any compressor operating at piston speeds and rates of revolution beyond the capacity of the valves now in use, or in any other apparatus in which its use may be found desirable or advantageous.

According to the present invention, the cylinder is provided with a head having a cylindrical valve casing in which a cylindrical valve is mounted for rotation upon a supporting shaft disposed at right angles to the cylinder axis and mounted on suitable bearings, preferably of the roller or other antifriction type, the valve having its outer cylindrical surface portions fitting the inner surface of the valve casing sufficiently closely to minimize gas leakage, but without permitting frictional contact between the surfaces of the valve and casing, thus permitting the valve, the shaft of which is preferably connected with and rotates at the same speed as the crank shaft, to be operated at high speed. The valve is provided with annular inlet and discharge passages at all times in communication with, respectively, the inlet and discharge openings of the valve casing, said annular passages being separated by a diagonally disposed curved partition, and the valve being provided on opposite sides of the said partition, respectively with a single inlet and a single discharge port, adapted to be brought into communication with a port in the valve casing communicating with the cylinder. The valve casing port communicating with the cylinder is of large area, and the inlet port of the rotary valve is preferably of greater area than the discharge port, and is preferably of such size as to substantially equal that of the valve casing port, and to register therewith in the fully opened position to insure the filling of the cylinder during the inlet stroke of the piston.

The valve and its casing are also provided with a chamber at each end of the valve, sealed against the escape of gas or vapor therefrom, into or through the bearing compartments, said chamber being connected with the inlet passage of the valve, and preferably by a passage, or passages, extending longitudinally of the valve, to maintain equal pressures at all times on the opposite ends of the valve, substantially equal to the inlet pressure, thus obviating the necessity for a step bearing, and simplifying and reducing the cost of manufacture.

The cylinder head is also provided at each end with enclosed spaces, one of which accommodates the driving gearing, and into which any gas or vapor leaking from the equalizing chambers will pass, and these spaces are connected with each other and with suitable leak-off means, to equalize pressures on opposite ends of the valve shaft and prevent end thrust thereon, as well as to take care of any leakage which may occur.

The invention also comprises certain novel features of construction and combination of parts herein shown and hereinafter fully described, and particularly pointed out in the claims.

Referring to the drawings,

Fig. 1 is a vertical sectional view of a compressor, embodying the present invention, taken longitudinally of the rotary valve, which is shown with its inlet port in full open position, the crank shaft and its connections with the valve mechanism being omitted, and certain parts being shown in elevation.

Fig. 2 is an elevation of the rotary valve, detached.

Fig. 3 is a detail sectional view, on the line 3—3 of Fig. 1.

Fig. 5 is a view similar to Fig. 1, showing the rotary valve with its discharge port in full open position, the crank shaft, driving means therefor, and connections between the crank shaft and valve operating shaft being indicated diagrammatically in dotted lines.

Fig. 6 is a section on line 6—6 of Fig. 5, omitting the crank and connected parts, the positions of the crank and crank shaft being indicated diagrammatically.

Fig. 7 is a perspective view of the upper portion of the piston.

Figure 4:
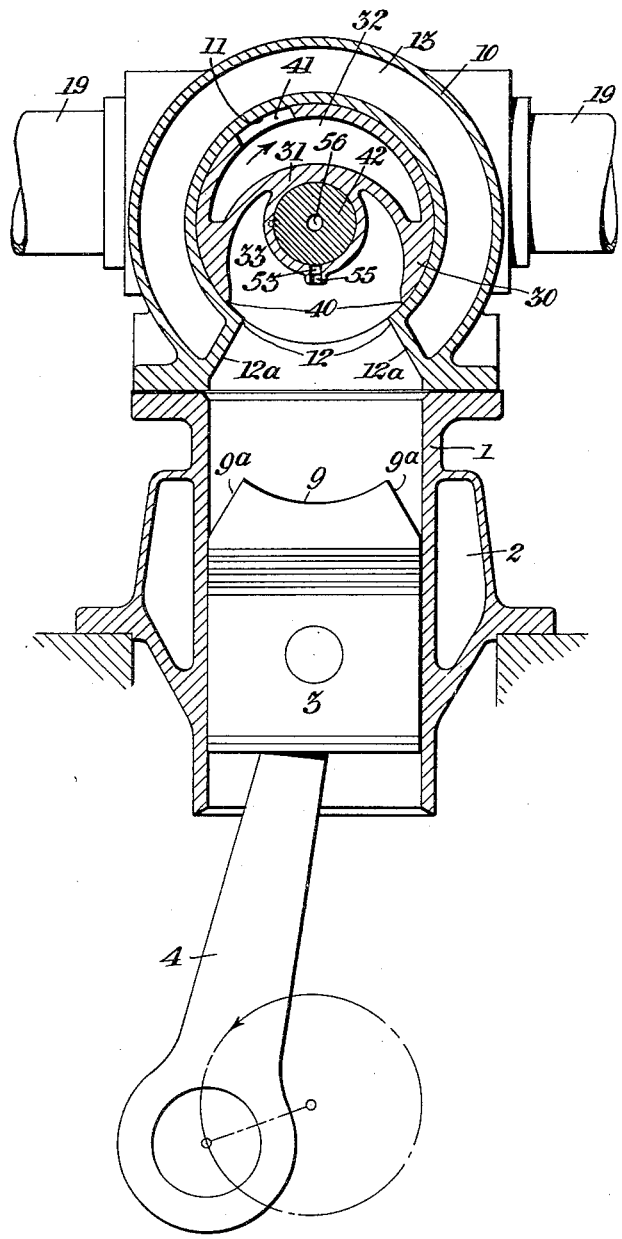
Fig. 4 is a section on line 4—4 of Fig. 1, the positions of the crank and crank shaft being indicated diagrammatically.

In the drawings, 1, represents a compressor cylinder provided with the usual water jacket, 2, and 3 represents the piston working in the cylinder, and connected by the connecting rod, 4, with a crank, 5, on the crank shaft, 6, mounted in suitable bearings, 7, as indicated in dotted lines in Fig. 5. Obviously the compressor will be provided with a crank case (not shown) in the usual manner. The crank shaft, 5, will necessarily be provided with some means for driving it at the predetermined speed, indicated graphically in this instance, also in dotted lines by a driving wheel, 8, which may be operatively connected in any desired manner with a suitable source of power.

The cylinder head, 10, contains a cylindrical valve casing or chamber, 11, the longitudinal axis of which extends perpendicularly with respect to the axis of the cylinder, 1, and said valve casing is provided with an aperture or port, 12, at all times in communication with the compressor cylinder, 1. This valve casing port is of very considerable area, equal to a very considerable percentage of the cross sectional area of the cylinder, 1, and it is preferred to make this aperture substantially oblong, of a length substantially equal to the diameter of the compressor cylinder, as shown in Figs. 1 and 5, and of a width but slightly less than its length, as indicated in Fig. 4. The cylinder head is preferably water jacketed, as indicated at 13, and is bolted or otherwise secured to the cylinder, 1, in any usual or preferred manner.

The piston, 3, has its head preferably formed, as indicated in Fig. 7, with a transversely disposed groove, 9, the face of which is a segment of a cylinder having a radius only slightly greater than the radius of the cylindrical valve chamber and the piston head is provided on each side of said groove with inclined or beveled faces, 9a, corresponding approximately with inclined faces, 12a, extending from the lateral edges of the cylinder head aperture, 12, to the bottom of the valve casing, as clearly shown in Figs. 4 and 6, so that when the piston is in its highest position, the surface of the transverse groove, 9, will conform very nearly with the inner surface of the cylindrical chamber, 11, of the valve casing, and the inclined or beveled faces, 9a, will approach very closely the inclined faces, 12a, so that there is an extremely small amount of clearance space when the piston is at the end of its discharge stroke, amounting to a very small percentage of the piston displacement, thus insuring the delivery of the greatest possible amount of compressed gas or vapor.

Figure 8:
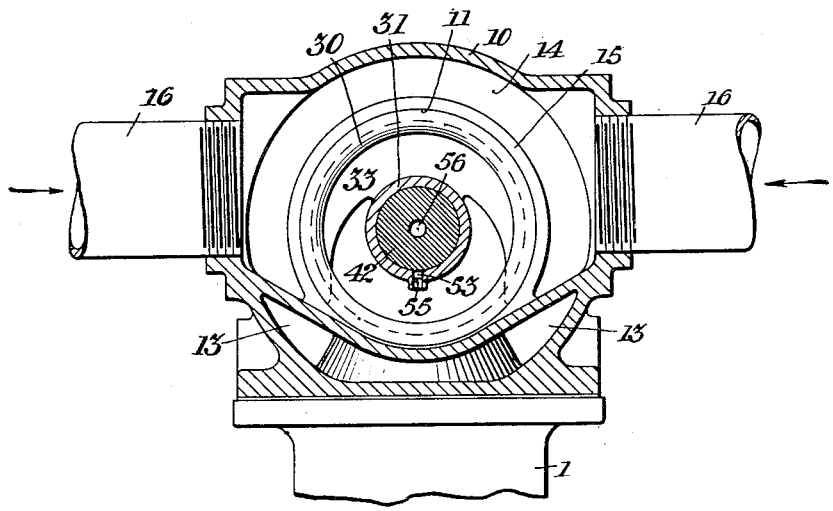
Fig. 8 is a section on line 8—8 of Fig. 1, looking in the direction of the arrow.

The cylinder head 10, is provided adjacent to one end with a cored inlet chamber, 14, completely surrounding the cylindrical valve chamber, 11, and communicating therewith by a circumferential slot or passage, 15, as shown in Fig. 8. The inlet chamber is provided with means for connecting it with a supply of gas or vapor to be compressed, and in this instance there is shown two oppositely disposed inlet pipes, 16, 16, either or both of which may be employed.

Figure 9:
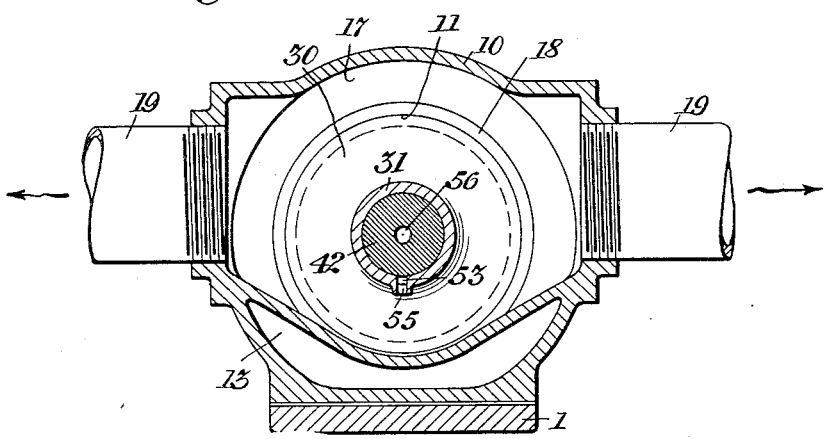
Fig. 9 is a section on line 9—9 of Fig. 1, looking in the direction of the arrow.

The valve casing, or cylinder head 10, is provided adjacent to its end with a similar discharge chamber, 17, shown in Fig. 9, which, likewise, communicates with the cylindrical valve casing by a circumferential slot or aperture, 18, and said chamber is shown provided with two discharge pipes, 19, communicating therewith, either or both of which may be used. Obviously, if only one inlet and discharge pipe is employed, the hole for the other will be plugged or closed, in any desired manner.

The cylinder head, 10, is preferably formed with open ends to facilitate the boring of the cylindrical valve casing, 11, and is provided at one end with an end casting, 20, having a closed outer end and containing one of the bearings for the valve shaft, preferably a roller bearing, 21, and a small chamber, 22, on the outer side of said bearing. At the opposite end the cylinder head is provided with an end casting, 23, carrying a valve shaft bearing, 24, and providing a chamber, 25, to enclose the gearing for the valve shaft, said chamber being closed by a closing plate, 26.

The rotary valve, indicated as a whole by the numeral, 30, is preferably formed with a central longitudinal sleeve portion, 31, having a shaft aperture therein, and a central cylindrical shell portion, 32, coaxial with the axis of the cylindrical valve chamber, the said sleeve and shell portions being connected by a diagonally disposed transversely and longitudinally curved partition, 33. The valve is also preferably provided at each end with a cylindrical end portion, indicated at 34 and 35, each connected with the sleeve by a curved annular web or wall, indicated at 36 and 37, which walls close the ends of the valve and support said end cylindrical portions 34 and 35 of the valve in spaced relation with respect to the opposite ends of the central cylindrical shell portions, thus forming annular passages, 38 and 39, respectively adapted to register with slots, 18 and 15, respectively. The annular passage, 39, connects the portions of the valve between the sleeve, 31, and central shell, 32, on one side of the partition, 33, at all times, with the inlet chamber, 14, and the annular passage, 38, connects the corresponding portion of the valve on the opposite side of the partition at all times with the discharge chamber, 17.

The central cylindrical shell, 32, of the valve is provided with a longitudinally disposed inlet port, 40, of a length substantially equal to that of the valve casing port, 12, and of a width preferably slightly greater than the width of the port, 12, as indicated in Fig. 4, in which the port, 40, is shown in the full open position. This valve port, 40, is so placed as to communicate with the portion of the valve on the side of the partition, 33, which communicates with the inlet chamber, 14. The large size of the inlet port, 40, and the valve casing port, 12, thus provides a direct unobstructed passage for the inflow of gas or vapor to the cylinder during the inlet stroke of the piston, resulting in substantially complete filling of the cylinder at each inlet piston stroke. The central cylindrical portion, 32 of the valve is also provided with a discharge port, 41, in communication with the portion of the valve on the opposite side of the partition, 33, which in turn communicates with the discharge chamber. The direction of rotation of the valve, is indicated in Figs. 4 and 6, for example, and the discharge port, 41, which is of substantially the same length as the valve casing port, 12, but of considerably less width, preferably has its center located a little more than 180° behind the center of the inlet port, 40, in the direction of revolution of the valve, so as to insure the complete closing of the inlet port, 40, and a considerable compression of the gas or vapor within the cylinder during the discharge stroke of the piston before the discharge port, 41, is opened. The preferred relation of the parts is illustrated in the drawings, but variations may be made therein without departing from the spirit of the invention.

The rotary valve, 30, is supported and rigidly secured to the valve shaft, 42, which extends through the sleeve portion, 31, of the valve, and is provided at opposite ends with reducing bearing portions, 43 and 44, supported in the roller bearings, 21 and 24, in any usual or preferred manner. The shaft, 42, is shown provided at each end with a spacing collar, indicated at 45, between the ends of the valve and the adjacent rotatable portions of the bearings, and the parts are united for joint rotation in any desired manner. In this instance the ends of the shaft, 42, are provided with nuts, 46, and I have shown the valve secured to the shaft by means of a key, 32a, engaging a keyway in the shaft, 42, and in the central cylindrical sleeve portion, 31, of the valve, as indicated in Fig. 3, for example, but the said parts may be connected in any other desired manner. It has been stated heretofore that the rotary valve, 30, is supported by its shaft in such manner that the outer surfaces of the cylindrical portions of the valve are held out of frictional contact with the inner surface of the cylindrical valve casing. This provides a distinct clearance between the valve and its casing, but this clearance, while actual, is so exceedingly small that there will be no very material leakage of gas between the valve and its casing. Obviously the pressure on opposite sides of the cylindrical portion, 35, of the valve, which is adjacent to the inlet passage or passages, is maintained at inlet pressure, and consequently there would be no leakage between the cylindrical portion, 35, and the valve casing. This portion of the valve may therefore be made slightly less in diameter than the other cylindrical portions of the valve. It will be understood that in the accompanying drawings the clearance between the valve and its casing is slightly exaggerated in order that it may appear in the drawings.

The annular curved webs or walls, 36 and 37, which close the ends of the valve and form one wall respectively of the annular discharge and inlet passages of the valve, also perform an additional function in forming one wall respectively of end chambers 49 and 50, in the valve casing, separated from the adjacent bearing by an annular plate, 51, suitable rotary sealing means being provided for the aperture in said plate through which the end spacing collar, 45, passes. The sealing means are indicated by the reference numerals, 52, 52, which may be of any usual or desired construction, and as they form no part of the present invention, they will not be further or specifically described. As the chamber, 50, adjacent to the inlet passages, will always be filled with gas at inlet pressure, and as there may be some leakage into the chamber, 49, from the adjacent discharge passages, there would result an excess pressure in the end chamber, 49, which would tend to exert a longitudinal thrust on the valve and necessitate the use of a step bearing. To obviate this, the pressures in the end chambers, 49 and 50, are equalized and maintained at the inlet pressure, preferably by providing a passage extending longitudinally of the valve between the inner sleeve portion, 31, and the shaft for connecting the chamber, 49, with the inlet passage of the valve, which is in constant communication with the inlet chamber in the head. In this instance the sleeve portion, 31, see particularly Fig. 3, is provided with a longitudinal groove or recess, 53, in its inner surface for connecting the chamber, 49, with an aperture, 55, extending through the cylindrical portion, 31, of the valve, and communicating with the inlet passage of the valve. While it is not absolutely necessary, the longitudinal groove or recess may conveniently extend, as shown, the entire length of the sleeve, 31, and may have its opposite end in communication with the chamber, 50. Communication between the groove, 53, and the chambers, 49 and 50, may be conveniently afforded by means of a notch or kerf formed either in the end portion of the valve body or the adjacent portion of the spacing collar. In the drawings, Fig. 1 for example, we have shown these kerfs at 54, formed in the ends of the valve body. Any leakage into the end chambers, which would tend to cause excess pressure, therefore flows through the passage provided by the groove or recess, 53, into the inlet passage of the valve, and this flow may occur in any position of the valve with respect to its casing. By reason of this construction, the pressures in the end chambers, 49 and 50, are not only equalized, but maintained substantially the same as the inlet pressure of the gas or vapor, thus obviating any necessity for a step bearing, which materially lessens the cost of construction of the valve mechanism. As it is not material that the groove, 53, should communicate with the chamber, 50, in view of the fact that said chamber will always be at inlet pressure where the said groove, 53, is extended the full length of the valve body as shown in the drawings, a portion of said groove adjacent to the chamber, 50, may be used as a keyway to receive the key, 32a instead of forming a separate keyway, if this is found to be desirable.

The valve shaft may be driven in any desired manner in timed relation with and at the same speed as the crank shaft. In this instance the shaft, 42, projects into the chamber, 25, of the end casting, 23, and is provided with a driving gear, 27, meshing with a driving pinion, 28, on a valve actuating shaft 29, which as indicated diagrammatically in Fig. 5, is provided at its lower end with a similar pinion, 28a, engaging a beveled gear, 27a, on the crank shaft, 6, the construction of the gearing being such that the valve will be given one complete revolution for each revolution of the crank shaft. It is to be understood, however, that the valve may be driven in any desired manner.

As it is possible that there may be some leakage of gas or vapor from the end chambers, 49 and 50, notwithstanding the sealing means, past the bearings, 21 and 24, into the chamber, 22, of the end casting, 20, and the chamber, 25, of the end casting, 23, and as the end chamber, 22, is adjacent to the high pressure end of the valve, it would be possible that a differential of pressures might exist on the opposite ends of the shaft, 42. In order to prevent the possibility of such a difference of pressure, the valve shaft, 42, is preferably provided with a longitudinal equalizing passage, 56, extending entirely through the shaft from the chamber, 22, to the chamber, 25, so that the pressures in said chambers will at all times be equal. One or both of the chambers, 22 and 25, may be provided with a suitable leak-off if found necessary or desirable, and in this instance the end casting, 23, is shown provided with a leak-off pipe, 57, which may be extended to any suitable point outside of the building in which the compressor is located. The valve mechanism may be lubricated in any desired manner, preferably by means of a pressure lubricating system, the details of which form no part of the present invention, and will not be described in detail. In the drawings, the end plate, 26, of the end casting, 23, is shown provided with an oil supply pipe communicating with a nozzle, 59, coaxial with and directed toward the equalizing passage, 56, to supply oil to the shaft bearing, 21, within the opposite end of the casting, 20, the pipe, 58, also communicating with a nozzle, 60, discharging within the chamber, 25, for supply lubricant to the driving gearing and the adjacent bearing, 24.

In Figs. 1 and 4 the piston is shown part way down on its suction or inlet stroke, with the inlet port, 40, of the valve, fully opened, to establish communication between the cylinder and the inlet passages of the valve and cylinder head. It is obvious that as the valve is turned during the completion of the suction stroke of the piston, the following edge of the valve port, 40, will gradually approach the edge of the port in the cylinder head, until it cuts off communication between the interior of the valve and the cylinder. As the piston moves up on its discharge or compression stroke, the further rotation of the valve brings the discharge port, 41, into registration with the valve casing port, 12, as indicated in Figs. 5 and 6, in which the discharge port, 41, is shown in its central position with respect to the valve casing port, 12, thus permitting the compressed gas or vapor to be discharged through the port, 41, and the discharge passage of the valve and cylinder head. The timing of the valve is preferably so arranged that after the closing of the inlet port, 40, which takes place when the piston is at substantially the lowest or outermost point in its stroke, a considerable interval elapses before the opening of the discharge port, 41, during which period of the cycle of operation the piston moving through its compressing stroke will compress the gas or vapor to the desired degree. The extremely large area of the inlet port, 40, effects substantially the complete filling of the cylinder during the suction stroke of the piston, and the movement of the discharge port, 41, of smaller area, across the large valve casing port, 12, provides for the adequate discharge of the compressed gas or vapor, which, by reason of the very small clearance space, will be nearly the complete contents of the cylinder.

While the timing of the valve indicated in the accompanying drawings has been found very desirable and satisfactory for the purpose for which the compressor is particularly intended, it is evident that the timing of the opening and closing positions for both inlet and discharge may be altered as desired by merely changing the positions of the valve ports with respect to each other around the valve. It will also be noted that the passages within the valve both for inlet and discharge are shaped so as to promote easy flow of the gas and this shaping, particularly at the ends of the valve, with special reference to the annular grooved end walls, 36 and 37, contribute to a more compact arrangement of the bearing than could otherwise be obtained. It will also be understood that in multi-cylinder compressors, each cylinder will be provided with a head containing the valve mechanism substantially as shown and described.

This invention is particularly applicable, as before stated, for use in compressors for the boosting of pressures at compressing stations arranged at intervals along natural gas transportation lines, and its use permits the production and economic operation of a comparatively small and inexpensive compressor capable of being operated at much higher piston speeds and rates of revolution than are now practicable, with a resulting capacity equal to or greater than the large and extremely expensive compressors now in use for this purpose, in which comparatively slow piston speeds and rates of revolution are imposed by reason of the limitations of the reciprocating valves usually employed in connection therewith.

In addition to permitting higher piston speeds and rates of revolution than can be employed with the automatic valves now in common use, the present invention presents the following important advantages.

1. A definite though extremely small clearance is provided between the rotary valve and the inner surface of the valve casing maintained by supporting the valve upon a shaft mounted in suitable bearings. By this means friction, binding, wear and the need for lubrication of the valve surface are eliminated, and a very small amount of power is required for the operation of the valve. Since this valve mechanism is intended for a machine operating at a high rate of revolution, gastightness of the valve is not important, such slight leakage as may take place per revolution being a very small percentage of the capacity of the compressor cylinder.

2. The valve shaft is supported in bearings of sufficient size to carry all side loads due to differences in gas pressure at various portions of the valve surface. There is, therefore, no need to provide means for balancing these side loads by applying gas pressure to certain portions of the valve surface of otherwise.

3. The construction of the valve mechanism provides for substantially complete balancing of all end thrust due to variable gas or vapor pressure within the valve itself, or within the valve casing. Hence no thrust bearings are required. This is an important advantage, as without such provision, excessive thrust loads will be encountered, especially where the pressure difference between the inlet and discharge gases is great and such pressure difference may at times exceed the capacity of any thrust bearing capable of use in connection with such an apparatus.

4. The end walls of the valve are so shaped as to direct the flow of gas or vapor in the desired direction without abrupt change of direction, which would otherwise result in a loss of pressure and reduction in the rate of flow. This feature contributes to the complete filling of the cylinder during the inlet stroke, and a smaller power loss in expelling the gas compressed to higher pressure during the discharge stroke.

5. The complete filling of the cylinder and easy discharge of the same are further promoted by the fact that only a single inlet and a single discharge port are employed, which are in constant communication respectively with the inlet and discharge passages of the valve casing and cylinder head. The large area of the inlet port in the valve and the valve casing, nearly equal to the cross sectional area of the cylinder, also contribute to the complete filling of the cylinder during all inlet strokes at relatively high speed of revolution.

6. The construction of the valve is such that the piston head may be brought within close proximity of the rotary valve at the end of its discharge stroke, and the piston is so shaped that an extremely small clearance space results. This is of particular advantage in a compressor operating at high pressures, as at the end of the discharge stroke very little gas is left in the cylinder to re-expand to inlet pressure before the next charge can be taken in and the reduction of the effective capacity of the cylinder due to such re-expansion is therefore very small.

What is claimed and desired to be secured by Letters Patent is:

1. The combination with a cylinder and piston, of a cylindrical valve casing communicating therewith and having its axis disposed substantially perpendicular to the axis of the cylinder and provided with coaxial bearings, and with an inlet and a discharge, a rotary valve in said casing having cylindrical portions of less exterior diameter than the interior diameter of the casing, and provided with a shaft mounted in said bearings and maintaining the said cylindrical portions of said valve at all times out of contact with the valve casing, said valve being provided with a diagonal partition, a single inlet port and a single discharge port on opposite sides of said partition, adapted to be brought into communication with the cylinder, said valve being provided adjacent to opposite ends of said partition with annular openings for maintaining constant communication respectively between said inlet port and the inlet of the valve casing, and between the discharge port and the discharge of the valve casing, and means for rotating said valve shaft and valve in timed relation with the piston.

2. The combination with a cylinder and piston, of a cylindrical valve casing having its axis substantially perpendicular to the axis of the cylinder and provided with a lateral cylinder port communicating with the cylinder, said valve casing being provided with coaxial bearings and with substantially peripheral inlet and discharge apertures, a rotary valve in said casing having cylindrical portions of less exterior diameter than the interior diameter of said casing, to provide a minute annular clearance, and having a supporting shaft mounted in said bearings and holding said valve out of frictional contact with said casing, said valve being provided with a diagonal partition, a single inlet port and a single discharge port on opposite sides of said partition and adapted to be brought into communication with the said cylinder port in the valve casing, and annularly disposed apertures adjacent to the opposite ends of said partition registering respectively with said peripheral apertures in the casing for maintaining constant communication respectively between the inlet port and said inlet aperture in the casing and between the discharge port and said discharge aperture in the casing, and means for rotating said valve in timed relation with the piston.

3. The combination with a cylinder and piston, of a cylindrical valve casing communicating therewith and having its axis disposed substantially perpendicularly to the axis of the cylinder and provided with coaxial bearings, and with an inlet and a discharge, a rotary valve in said casing having cylindrical portions of less exterior diameter than the interior diameter of the casing, and provided with a shaft mounted in said bearings and maintaining the said cylindrical portions of said valve at all times out of contact with the valve casing, said valve being provided with a diagonal partition, and a single inlet port and a single discharge port on opposite sides of said partition, adapted to be brought into communication with the cylinder, said valve being provided adjacent to opposite ends of said partition with annular openings for maintaining constant communication respectively between said inlet port and the inlet of the valve casing, and between the discharge port and the discharge of the valve casing, said valve being provided with end walls forming between them and the adjacent ends of said valve casing enclosed end chambers, means for equalizing pressures in said end chambers to prevent end thrust on the valve, and means for rotating said valve in timed relation to the piston.

4. The combination with a cylinder and piston, of a cylindrical valve casing communicating therewith and having its axis disposed substantially perpendicularly to the axis of the cylinder and provided with coaxial bearings, and with an inlet and a discharge, a rotary valve in said casing having cylindrical portions of less exterior diameter than the interior diameter of the casing, and provided with a shaft mounted in said bearings and maintaining the said cylindrical portions of said valve at all times out of contact with the valve casing, said valve being provided with a diagonal partition, a single inlet port and a single discharge port on opposite sides of said partition, adapted to be brought into communication with the cylinder, said valve being provided adjacent to opposite ends of said partition with annular openings for maintaining constant communication respectively between said inlet port and the inlet of the valve casing, and between said discharge port and the discharge of the valve casing, said valve being provided with end walls forming between them and the adjacent ends of said valve casing enclosed end chambers, and a pressure equalizing passage extending longitudinally of the valve and connecting the end chamber adjacent to said discharge, with the inlet passage of the valve to prevent end thrust on the valve, and means for rotating the valve in timed relation with the piston.

5. The combination with a cylinder and piston, of a cylindrical valve casing having its axis substantially perpendicular to the axis of the cylinder and provided with a lateral cylinder port communicating with the cylinder, said valve casing being provided with coaxial bearings and with substantially peripheral inlet and discharge apertures, a rotary valve in said casing having cylindrical portions of less exterior diameter than the interior diameter of said casing, to provide a minute annular clearance, and having a supporting shaft mounted in said bearings and holding said valve out of frictional contact with said casing, said valve being provided with a diagonal partition, a single inlet port and a single discharge port on opposite sides of said partition and adapted to be brought into communication with the said cylinder port in the valve casing, and annularly disposed apertures adjacent to the opposite ends of said partition registering respectively with said peripheral apertures in the casing for maintaining constant communication respectively between the inlet port and said inlet aperture in the casing and between the discharge port and said discharge aperture in the casing, said valve being provided with end walls forming between them and the adjacent ends of said valve casing enclosed end chambers, and a pressure equalizing passage connected with each of said end chambers and communicating with the inlet passage of said valve to prevent end thrust on the valve, and means for rotating the valve in timed relation with the piston.

6. The combination with a cylinder and piston, of a cylindrical valve casing having its axis substantially perpendicular to the axis of the cylinder and provided with a lateral cylinder port communicating with the cylinder, said valve casing being provided with coaxial bearings and with substantially peripheral inlet and discharge apertures, a rotary valve in said casing having cylindrical portions of less exterior diameter than the interior diameter of said casing, to provide a minute annular clearance, and having a supporting shaft mounted in said bearings and holding said valve out of frictional contact with said casing, said valve being provided with a diagonal partition, a single inlet port and a single discharge port on opposite sides of said partition and adapted to be brought into communication with the said cylinder port in the valve casing, and annularly disposed apertures adjacent to the opposite ends of said partition registering respectively with said peripheral apertures in the casing for maintaining constant communication respectively between the inlet port and said inlet aperture in the casing and between the discharge port and said discharge aperture in the casing, said valve being provided with end walls forming between them and the adjacent ends of said valve casing enclosed end chambers, and a pressure equalizing passage extending longitudinally of the valve and connecting said end chambers to prevent end thrust on the valve, said passage being provided between its ends with a lateral aperture communicating with the inlet passage of the valve, and means for rotating the valve in timed relation with the piston.

7. The combination with a cylinder and piston, of a cylindrical valve casing communicating therewith and having its axis disposed substantially perpendicularly to the axis of the cylinder and provided with coaxial bearings, and with an inlet and a discharge, a rotary valve in said casing having cylindrical portions of less exterior diameter than the interior diameter of the casing, and provided with a shaft mounted in said bearings and maintaining the said cylindrical portions of said valve at all times out of contact with the valve casing, said valve being provided with a diagonal partition, a single inlet port and a single discharge port on opposite sides of said partition, adapted to be brought into communication with the cylinder, said valve being provided adjacent to opposite ends of said partition with annular openings for maintaining constant communication respectively between said inlet port and the inlet of the valve casing, and between the discharge port and the discharge of the valve casing, said valve being provided with end walls forming between them and the adjacent ends of said valve casing enclosed end chambers, and a pressure equalizing passage connected with each of said end chambers to prevent end thrust of the valve, said valve casing being provided with closed end chambers enclosing the ends of the valve shaft and collecting gas or vapor leaking past the bearings, means for equalizing pressures in said end chambers of the valve casing to prevent end thrust on the valve shaft, and means for rotating said valve in timed relation with the piston.

8. The combination with a cylinder and piston, of a cylindrical valve casing communicating with and disposed transversely to the cylinder and provided with substantially peripheral inlet and discharge apertures, a rotary valve, in said casing, a valve shaft holding the cylindrical portion of said valve out of contact with said casing, said valve being provided with a diagonal partition, a single inlet port and a single discharge port on opposite sides of said partition, adapted to be brought into communication with the cylinder, and having adjacent to opposite ends of said partition annular openings communicating respectively with the peripheral inlet and discharge apertures of the valve casing, said valve being provided with end walls forming between each and the adjacent end of the valve casing an enclosed end chamber, a pressure equalizing passage connecting said enclosed chambers, said valve casing being provided with end chambers enclosing the ends of the valve shaft, a pressure equalizing passage connected with said end chambers, and means for rotating said valve in timed relation to the piston.

9. The combination with a cylinder and piston, of a cylindrical valve casing communicating with and disposed transversely to the cylinder and provided with substantially peripheral inlet and discharge apertures, a rotary valve in said casing, a valve shaft holding the cylindrical portion of said valve out of contact with said casing, said valve being provided with a diagonal partition, a single inlet port and a single discharge port on opposite sides of said partition, adapted to be brought into communication with the cylinder, and having adjacent to opposite ends of said partition annular openings communicating respectively with the peripheral inlet and discharge apertures of the valve casing, said valve being provided with end walls forming between each and the adjacent end of the valve casing an enclosed end chamber, a pressure equalizing passage connecting said enclosed chambers, said valve casing being provided with end chambers enclosing the ends of the valve shaft, a pressure equalizing passage connecting said end chambers, a leak off operatively connected with said end chambers, and means for rotating said valve in timed relation to the piston.

10. The combination with a cylinder and piston, of a cylindrical valve casing having its axis substantially perpendicular to the axis of the cylinder and provided with a lateral cylinder port, having an area substantially equal to a major fraction of the cross sectional area of the cylinder, and with substantially peripheral inlet and discharge apertures, a rotary valve in said casing, a supporting shaft holding said valve out of frictional contact with said casing, said valve being provided with a diagonal partition, a single inlet port on one side of said partition, of substantially the same area as said cylinder port and adapted to substantially register therewith when in fully open position, and a single discharge port on the opposite side of said partition of less width in the direction of rotation of the valve than the inlet port, and having a solid peripheral portion between the inlet port and the leading edge of the discharge port of sufficient width in the direction of rotation of the valve to insure the closing of the cylinder port during a predetermined portion of the compressing stroke of the piston, said valve having annularly disposed apertures adjacent to the opposite ends of said partition registering respectively with said peripheral apertures in the casing, and means for rotating said valve in timed relation with the piston.

LEONARD OCHTMAN, JR.
ROBERT C. ENGELMAN.